(12) United States Patent
Alexeev et al.

(10) Patent No.: US 6,513,338 B1
(45) Date of Patent: Feb. 4, 2003

(54) REFRIGERANT MIXTURE FOR A MIXTURE-THROTTLING PROCESS

(75) Inventors: Alexander Alexeev, Dresden (DE); Hans Quack, Dresden (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 09/674,949

(22) PCT Filed: Apr. 30, 1999

(86) PCT No.: PCT/EP99/02931

§ 371 (c)(1),
(2), (4) Date: Nov. 7, 2000

(87) PCT Pub. No.: WO99/58624

PCT Pub. Date: Nov. 18, 1999

(30) Foreign Application Priority Data

May 12, 1998 (DE) .......................... 198 20 960
May 13, 1998 (DE) .......................... 198 21 272

(51) Int. Cl.$^7$ .............................................. F25B 43/02
(52) U.S. Cl. .............................. 62/84; 62/612; 62/613; 62/623

(58) Field of Search ............................ 62/612, 613, 84, 62/623

(56) References Cited

U.S. PATENT DOCUMENTS

| | | | | |
|---|---|---|---|---|
| 5,787,715 A | * | 8/1998 | Dobak, III et al. | 62/51.2 |
| 5,950,453 A | * | 9/1999 | Bowen et al. | 62/612 |
| 6,041,621 A | * | 3/2000 | Olszewski et al. | 62/613 |
| 6,125,653 A | * | 10/2000 | Shu et al. | 62/622 |
| 6,209,350 B1 | * | 4/2001 | Kimble, III | 62/613 |
| 6,250,105 B1 | * | 6/2001 | Kimble | 62/613 |
| 6,311,516 B1 | * | 11/2001 | Key et al. | 62/619 |
| 6,330,811 B1 | * | 12/2001 | Arman et al. | 62/643 |

* cited by examiner

Primary Examiner—William C. Doerrler
Assistant Examiner—Mark Shulman
(74) Attorney, Agent, or Firm—Connolly Bove Lodge & Hutz LLP

(57) ABSTRACT

A refrigerant mixture for a mixture throttle process contains from 0.06 mol/mol to 0.20 mol/mol propane, from 0.26 mol/mol to 0.36 mol/mol nitrogen and from 0.20 mol/mol to 0.38 mol/mol methane, the remainder being ethane.

19 Claims, No Drawings

REFRIGERANT MIXTURE FOR A MIXTURE-THROTTLING PROCESS

The invention relates to a refrigerant mixture for a mixture throttle process for refrigeration in the 90 to 110 K temperature range.

According to the prior art, processes are known for refrigeration in the 65 to 150 K temperature range. In these processes, a refrigerant gas is compressed in a compressor from a relatively low pressure (low pressure) to a relatively high pressure (high pressure) and cooled to ambient temperature in an aftercooler. The compressed refrigerant is then cooled in the high pressure flow in a heat exchanger in countercurrent with the as yet uncompressed refrigerant, and finally expanded using a throttle valve to bring it into the two-phase range for the refrigerant. Following the expansion, the liquid component of the refrigerant is partially evaporated in an evaporator with the output of refrigerating power. The refrigerant leaving the evaporator is fed in the low pressure flow to the countercurrent heat exchanger and warmed in it by the compressed refrigerant. Finally, the warmed refrigerant is fed back to the compressor.

Mixtures of gases with standard boiling points below 320 K are often used as the refrigerant. These include, for example, hydrogen, nitrogen, oxygen, noble gases, hydrocarbons and halogenated hydrocarbons. The processes described above are referred to, when such mixtures of substances are used as the refrigerant, as "mixture Joule Thomson processes".

For the compression of the refrigerant, it is advantageous to use an oil-lubricated compressor. The service interval for oil-lubricated compressors is, at over 20,000 operating hours, relatively long. This guarantees a high degree of reliability for the overall refrigeration system since there are no other components with mechanical moving parts.

The use of an oil-lubricated compressor has the associated disadvantage that oil can enter the refrigerant from the compressor and can thus be entrained into the refrigeration cycle. If the oil enters the cold part of the refrigeration system, then it freezes at the low temperatures occurring in the evaporator and obstructs the evaporator. The compressor must therefore have appropriate components connected downstream of it in order to separate oil from the refrigerant after the latter has been compressed. Because of the relatively high temperatures of the compressed refrigerant, both aerosol and vapour oil components are generally present in the refrigerant. As the cleaning unit, it may be advantageous to use a liquid/oil separator with oil return to the compressor and an adsorber connected downstream to extract oil vapour components and any ultrafine droplets still remaining. This arrangement has already been described (R. C. Longsworth, M. J. Boiarski, L. A. Klusmier, 80 K Closed Cycle Throttle Refrigerator, Proceedings of the 8th International Cryocooler Conference, Vail Co., June 1994).

The efficiency of a mixture Joule-Thomson process depends strongly on the composition of the refrigerant mixture. During the constant circulation of the refrigerant mixture, components with higher boiling points are absorbed more and more in the adsorber, so that the overall composition changes. The change in the composition leads to substantial deterioration of the characteristics of the system and the required refrigerating power or refrigeration temperature are no longer achieved. It is then necessary to replace the refrigerant mixture.

For the thermodynamic efficiency of the refrigerant mixture cycle, it is important to use particular refrigerant mixture compositions. The main selection criterion for the composition is the size and distribution of the temperature difference between the high and low pressure flows in the Joule Thomson heat exchanger. The temperature difference should be as small as possible, and the distribution of the temperature difference in the heat exchanger should be as uniform as possible.

Refrigerant mixtures which provide a particularly favourable temperature difference distribution in the heat exchanger are usually not in the gas phase, but partially liquefied before entering the Joule Thomson heat exchanger. This is achieved by adding components with higher boiling points, for example propane or isobutane (A. Alexeev, H. Quack, Ch. Haberstroh, Low cost mixture Joule Thomson Refrigerator, Cryogenics, Proceedings of the 16th International Cryogenic Engineering Conference, Kitakyushu, Japan, 1996).

The components of the mixture with higher boiling points generally also have a higher freezing point. At low temperatures in the cold part, these components could freeze and obstruct the evaporator. For this reason, the proportion of components with higher boiling points in the refrigerant mixture should be as low as possible. The advantages of using refrigerant mixtures are thus not fully exploited, and the efficiency which might potentially be obtained is not achieved. This is a further disadvantage of the mixture Joule Thomson processes known in the prior art.

The object of the invention is to obtain a mixture composition which makes it possible, at the same time, to increase the efficiency of the refrigeration system and reduce the risk of components of the mixture freezing at low temperatures in the cold part of the system.

According to the invention, the object is achieved by a refrigerant mixture which contains from 0.06 mol/mol to 0.20 mol/mol propane, from 0.26 mol/mol to 0.36 mol/mol nitrogen and from 0.20 mol/mol to 0.38 mol/mol methane, the remainder being ethane.

The advantage of the refrigerant mixture is that the requirements in terms of temperature distribution are satisfied and that a favourable temperature difference, which is to say a relatively uniform and relatively small temperature difference, is created in the Joule Thomson heat exchanger.

According to the invention, the proportions in the refrigerant mixture, relative to one mole of refrigerant mixture, are the following nitrogen
  from: $Z_{N2}=1.07\ Z_{C3H8}+(0.022P_h-0.14)$ mol/mol
  to: $Z_{N2}=1.23\ Z_{C3H8}+(0.022P_h-0.14)$ mol/mol
propane
  from: $Z_{C3H8}=0.27-P_h/100\ \pm0.02$ (high pressure in bar)
methane
  from: $Z_{CH4}=(2.2-0.07P_h)\ Z_{C3H8}+(P_h-2)/100$ mol/mol
  to: $Z_{CH4}=(2.8-0.1P_h)Z_{C3H8}+(P_h-1)/100$ mol/mol,
the remainder being ethane.

In these expressions, $P_h$ indicates the pressure for the high temperature range of the mixture throttle process.

According to the invention, the refrigerant mixture has a temperature of from 233 to 243 K before entering the Joule Thomson heat exchanger.

According to the invention, it is proposed that the pressure of the refrigerant mixture is from 1 to 3 bar, preferably from 1.5 to 2.5 bar and particularly preferably from 1.6 to 1.8 bar before it is compressed, and that the refrigerant mixture has a pressure of from 10 to 28 bar, preferably from 12 to 18 bar and particularly preferably from 14 to 16 bar after it is compressed.

According to the invention, the refrigerant mixture is used in a process for refrigeration in the 90 to 110 K temperature range, in which the refrigerant mixture is compressed using an oil-lubricated compressor, then cooled to ambient temperature and then oil is removed from the refrigerant mixture before the refrigerant is fed to a Joule Thomson heat exchanger, and in which the refrigerant mixture is additionally cooled after it has been cooled to ambient temperature and before it enters the Joule Thomson heat exchanger.

The device for the additional cooling will here be referred to as an oil condenser. This is because, surprisingly, the relatively minor additional cooling advantageously makes other oil components condense from the refrigerant flow to a considerable extent.

In the process, according to the invention, the refrigerant mixture is additionally cooled after it has been cooled to ambient temperature and before the oil is removed.

According to the invention, it is proposed that in the process, the refrigerant mixture is additionally cooled after the oil has been removed and before entering the Joule Thomson heat exchanger. For this purpose, after the oil has been removed, the refrigerant flow is advantageously cooled in another heat exchanger, so that the refrigerant is in partially liquefied form in the Joule Thomson heat exchanger. The heat exchangers for cooling the high pressure flow to below ambient temperature advantageously obtain their refrigerating power from an additional refrigeration system.

According to the invention, in the process, predominantly liquid oil components are removed from the refrigerant mixture after the refrigerant mixture has been cooled to ambient temperature. If the partial pressure of the oil vapours in the flow of the compressed refrigerant mixture downstream of the liquid/oil separator is less than about $10^{-3}$ mbar, or if the desired evaporation temperature is above 120 K, then in the process according to the invention, technically viable purity of the refrigerant mixture may already be achieved advantageously only with a liquid/oil separator as the oil separation stage.

According to the invention, in the process, it is also proposed, after the predominantly liquid oil component has been removed from the refrigerant mixture, then to remove the predominantly vapour oil component from the refrigerant mixture. The removal is advantageously carried out with a liquid/oil separator and an adsorber connected downstream, the oil droplets which the refrigerant flow contains being precipitated in the liquid/oil separator and the remaining refrigerant flow, then with minor oil vapour components, being purified further in an adsorber. The oil vapours from the refrigerant gas after compression condense out quite readily and are quite readily precipitated in the liquid/oil separator. The concentration of the residual oil in the refrigerant gas mixture downstream of the liquid/oil separator is relatively low, which substantially relieves the burden on the adsorber. A relatively cold refrigerant mixture flows through the adsorber, and therefore cools it. The specific capacity of the adsorbent in the adsorber is thus increased compared with processes according to the prior art, and the service interval for the adsorber and therefore for the overall refrigeration device is increased.

The invention will now be described in more detail by way of example with reference to tables of advantageous refrigerant mixture compositions.

Tables

Mixture compositions for the refrigerant mixture according to the invention, optimized for particular values of the high pressure and low pressure of the mixture throttle process and for a precooling temperature of about 243 K (−30° C.).

Legend

HP High pressure

LP Low pressure q specific refrigerating power of the cycle at a refrigeration temperature of 100 K

| | LP = 1.6 bar HP = 12 bar | | |
|---|---|---|---|
| propane, mol/mol | 0.14 | 0.16 | 0.18 |
| nitrogen, mol/mol | 0.289 | 0.311 | 0.313 |
| methane, mol/mol | 0.293 | 0.318 | 0.385 |
| ethane, mol/mol | 0.278 | 0.211 | 0.122 |
| q, kJ/mol | 1.084 | 1.235 | 1.215 |

| | LP = 1.8 bar HP = 12 bar | | |
|---|---|---|---|
| propane, mol/mol | 0.14 | 0.16 | 0.18 |
| nitrogen, mol/mol | 0.288 | 0.31 | 0.306 |
| methane, mol/mol | 0.304 | 0.329 | 0.409 |
| ethane, mol/mol | 0.268 | 0.201 | 0.105 |
| q, kJ/mol | 1.029 | 1.177 | 1.126 |

| | LP = 2 bar HP = 12 bar | | |
|---|---|---|---|
| propane, mol/mol | 0.14 | 0.16 | 0.18 |
| nitrogen, mol/mol | 0.286 | 0.309 | 0.319 |
| methane, mol/mol | 0.313 | 0.339 | 0.329 |
| ethane, mol/mol | 0.261 | 0.192 | 0.172 |
| q, kJ/mol | 0.977 | 1.21 | 1.079 |

| | LP = 2.2 bar HP = 12 bar | | |
|---|---|---|---|
| propane, mol/mol | 0.14 | 0.16 | 0.18 |
| nitrogen, mol/mol | 0.286 | 0.309 | 0.306 |
| methane, mol/mol | 0.321 | 0.347 | 0.431 |
| ethane, mol/mol | 0.253 | 0.184 | 0.083 |
| q, kJ/mol | 0.932 | 1.07 | 0.944 |

| LP = 2.4 bar | |
|---|---|
| HP = 12 bar | |
| propane, mol/mol | 0.16 |
| nitrogen, mol/mol | 0.31 |
| methane, mol/mol | 0.353 |
| ethane, mol/mol | 0.177 |
| q, kJ/mol | 1.02 |

| LP = 2.6 bar | |
|---|---|
| HP = 12 bar | |
| propane, mol/mol | 0.16 |
| nitrogen, mol/mol | 0.311 |
| methane, mol/mol | 0.359 |
| ethane, mol/mol | 0.17 |
| q, kJ/mol | 0.981 |

| LP = 1.6 bar HP = 14 bar | | | | |
|---|---|---|---|---|
| propane, mol/mol | 0.1 | 0.12 | 0.14 | 0.16 |
| nitrogen, mol/mol | 0.295 | 0.318 | 0.337 | 0.337 |
| methane, mol/mol | 0.245 | 0.267 | 0.295 | 0.359 |
| ethane, mol/mol | 0.36 | 0.295 | 0.228 | 0.144 |
| q, kJ/mol | 1.092 | 1.248 | 1.374 | 1.393 |

| LP = 1.8 bar HP = 14 bar | | | | |
|---|---|---|---|---|
| propane, mol/mol | 0.1 | 0.12 | 0.14 | 0.16 |
| nitrogen, mol/mol | 0.293 | 0.317 | 0.336 | 0.335 |
| methane, mol/mol | 0.253 | 0.275 | 0.303 | 0.375 |
| ethane, mol/mol | 0.354 | 0.288 | 0.221 | 0.13 |
| q, kJ/mol | 1.044 | 1.197 | 1.323 | 1.312 |

| LP = 2 bar HP = 14 bar | | | | |
|---|---|---|---|---|
| propane, mol/mol | 0.1 | 0.12 | 0.14 | 0.16 |
| nitrogen, mol/mol | 0.292 | 0.315 | 0.335 | 0.339 |
| methane, mol/mol | 0.26 | 0.283 | 0.31 | 0.389 |
| ethane, mol/mol | 0.348 | 0.282 | 0.215 | 0.112 |
| q, kJ/mol | 0.998 | 1.144 | 1.27 | 1.231 |

| LP = 2.2 bar HP = 14 bar | | | | |
|---|---|---|---|---|
| propane, mol/mol | 0.1 | 0.12 | 0.14 | 0.16 |
| nitrogen, mol/mol | 0.291 | 0.315 | 0.344 | 0.344 |
| methane, mol/mol | 0.265 | 0.291 | 0.314 | 0.294 |
| ethane, mol/mol | 0.344 | 0.274 | 0.202 | 0.202 |
| q, kJ/mol | 0.953 | 1.096 | 1.217 | 1.122 |

| LP = 2.4 bar HP = 14 bar | | | | |
|---|---|---|---|---|
| propane, mol/mol | 0.1 | 0.12 | 0.14 | 0.16 |
| nitrogen, mol/mol | 0.292 | 0.315 | 0.335 | 0.343 |
| methane, mol/mol | 0.27 | 0.297 | 0.327 | 0.383 |
| ethane, mol/mol | 0.338 | 0.268 | 0.198 | 0.114 |
| q, kJ/mol | 0.914 | 1.052 | 1.171 | 1.089 |

| LP = 2.6 bar HP = 14 bar | | | |
|---|---|---|---|
| propane, mol/mol | 0.12 | 0.14 | 0.16 |
| nitrogen, mol/mol | 0.316 | 0.335 | 0.345 |
| methane, mol/mol | 0.301 | 0.333 | 0.38 |
| ethane, mol/mol | 0.263 | 0.192 | 0.115 |
| q, kJ/mol | 1.009 | 1.122 | 1.022 |

| LP = 1.6 bar HP = 16 bar | | | | | | |
|---|---|---|---|---|---|---|
| propane, mol/mol | 0.06 | 0.08 | 0.1 | 0.12 | 0.14 | 0.16 |
| nitrogen, mol/mol | 0.289 | 0.313 | 0.337 | 0.352 | 0.359 | 0.346 |
| methane, mol/mol | 0.201 | 0.224 | 0.243 | 0.274 | 0.319 | 0.409 |
| ethane, mol/mol | 0.45 | 0.383 | 0.32 | 0.254 | 0.182 | 0.085 |
| q, kJ/mol | 1.031 | 1.19 | 1.343 | 1.451 | 1.514 | 1.397 |

| LP = 1.8 bar HP = 16 bar | | | | | | |
|---|---|---|---|---|---|---|
| propane, mol/mol | 0.06 | 0.08 | 0.1 | 0.12 | 0.14 | 0.16 |
| nitrogen, mol/mol | 0.287 | 0.312 | 0.336 | 0.352 | 0.358 | 0.355 |
| methane, mol/mol | 0.207 | 0.23 | 0.25 | 0.28 | 0.329 | 0.391 |
| ethane, mol/mol | 0.446 | 0.378 | 0.314 | 0.248 | 0.173 | 0.094 |
| q, kJ/mol | 0.986 | 1.142 | 1.293 | 1.405 | 1.453 | 1.329 |

| LP = 2 bar HP = 16 bar | | | | | | |
|---|---|---|---|---|---|---|
| propane, mol/mol | 0.06 | 0.08 | 0.1 | 0.12 | 0.14 | 0.16 |
| nitrogen, mol/mol | 0.286 | 0.311 | 0.335 | 0.352 | 0.357 | 0.358 |
| methane, mol/mol | 0.212 | 0.236 | 0.256 | 0.287 | 0.034 | 0.396 |
| ethane, mol/mol | 0.442 | 0.373 | 0.309 | 0.241 | 0.163 | 0.086 |
| q, kJ/mol | 0.943 | 1.097 | 1.247 | 1.358 | 1.393 | 1.238 |

| LP = 2.2 bar HP = 16 bar | | | | | | |
|---|---|---|---|---|---|---|
| propane, mol/mol | 0.06 | 0.08 | 0.1 | 0.12 | 0.14 | 0.16 |
| nitrogen, mol/mol | 0.285 | 0.31 | 0.334 | 0.352 | 0.357 | 0.355 |
| methane, mol/mol | 0.217 | 0.242 | 0.262 | 0.292 | 0.349 | 0.412 |
| ethane, mol/mol | 0.438 | 0.368 | 0.304 | 0.236 | 0.154 | 0.073 |
| q, kJ/mol | 0.903 | 1.052 | 1.203 | 1.314 | 1.335 | 1.136 |

| LP = 2.4 bar HP = 16 bar | | | | | |
|---|---|---|---|---|---|
| propane, mol/mol | 0.08 | 0.1 | 0.12 | 0.14 | 0.16 |
| nitrogen, mol/mol | 0.31 | 0.334 | 0.352 | 0.356 | 0.358 |
| methane, mol/mol | 0.246 | 0.268 | 0.298 | 0.359 | 0.411 |
| ethane, mol/mol | 0.364 | 0.298 | 0.23 | 0.145 | 0.071 |
| q, kJ/mol | 1.014 | 1.16 | 1.27 | 1.274 | 1.066 |

| LP = 2.6 bar HP = 16 bar | | | | |
|---|---|---|---|---|
| propane, mol/mol | 0.08 | 0.1 | 0.12 | 0.14 |
| nitrogen, mol/mol | 0.31 | 0.335 | 0.353 | 0.357 |
| methane, mol/mol | 0.25 | 0.272 | 0.302 | 0.365 |
| ethane, mol/mol | 0.36 | 0.293 | 0.225 | 0.138 |
| q, kJ/mol | 0.973 | 1.119 | 1.227 | 1.217 |

What is claimed is:

1. A process for refrigeration in the 90 to 110 K temperature range, characterized in that a refrigerant mixture is compressed using an oil-lubricated compressor, then cooled to ambient temperature and then oil is removed from the refrigerant mixture before the refrigerant is fed to a Joule Thomson heat exchanger, and in which the refrigerant mixture is additionally cooled after it has been cooled to ambient temperature and before it enters the Joule Thomson heat exchanger, where as refrigerant mixture a mixture is used containing from 0.06 mol/mol to 0.20 mol/mol propane, from 0.26 mol/mol to 0.36 mol/mol nitrogen and from 0.20 mol/mol to 0.38 mol/mol methane, the remainder being ethane.

2. Process according to claim 1, characterized in that the refrigerant mixture contains the following proportions
nitrogen
from: $Z_{N2}=1.07\ Z_{C3H8}+(0.022P_h-0.14)$ mol/mol
to: $Z_{N2}=1.23\ Z_{C3H8}+(0.022P_h-0.14)$ mol/mol
propane
from: $Z_{C3H8}=0.27-P_h/100\pm0.02$ (high pressure in bar)
methane
from: $Z_{CH4}=(2.2-0.07P_h)\ Z_{C3H8}+(P_h-2)/100$ mol/mol
to: $Z_{CH4}=(2.8-0.1P_h)\ Z_{C3H8}+(P_h-1)/100$ mol/mol
the remainder being ethane.

3. Process according to claim 2, characterized in that the refrigerant mixture has a temperature of from 233 to 243 K before entering the Joule Thomson heat exchanger.

4. Refrigerant mixture according to claim 3, characterized in that the refrigerant mixture has a pressure of from 1 to 3 bar before it is compressed, and in that the refrigerant mixture has a pressure of from 10 to 28 bar.

5. Process according to claim 1, characterized in that, in the process, the refrigerant mixture is additionally cooled after it has been cooled to ambient temperature and before the oil is removed.

6. Process according to claim 1, characterized in that, in the process, the refrigerant mixture is additionally cooled after the oil has been removed and before entering the Joule Thomson heat exchanger.

7. Process according to claim 6, characterized in that, in the process, predominantly liquid oil components are removed from the refrigerant mixture after the refrigerant mixture has been cooled to ambient temperature.

8. Process according to claim 7, characterized in that, in the process, after the predominantly liquid oil component has been removed from the refrigerant mixture, the predominantly vapor oil component is then removed from the refrigerant mixture.

9. Process according to claim 1, characterized in that, in the process, predominantly liquid oil components are removed from the refrigerant mixture after the refrigerant mixture has been cooled to ambient temperature.

10. Process according to claim 4, characterized in that the refrigerant mixture has a pressure from 1.5 to 2.5 bar before it is compressed.

11. Process according to claim 10, characterized in that the refrigerant mixture has a pressure from 1.6 to 1.8 bar before it is compressed.

12. Process according to claim 4, characterized in that the refrigerant mixture has a pressure from 12 to 18 bar after it is compressed.

13. Process according to claim 12, characterized in that the refrigerant mixture has a pressure from 14 to 16 bar after it is compressed.

14. Process according to claim 1, characterized in that the refrigerant mixture has a temperature of from 233 to 243K before entering the Joule Thomson heat exchanger.

15. Process according to claim 1, characterized in that the refrigerant mixture has a pressure of from 1 to 3 bar before it is compressed, and in that the refrigerant mixture has a pressure of from 10 to 28 bar after it is compressed.

16. Process according to claim 15, characterized in that the refrigerant mixture has a pressure from 1.5 to 2.5 bar before it is compressed.

17. Process according to claim 16, characterized in that the refrigerant mixture has a pressure from 1.6 to 1.8 bar before it is compressed.

18. Process according to claim 15, characterized in that the refrigerant mixture has a pressure from 12 to 18 bar after it is compressed.

19. Process according to claim 18, characterized in that the refrigerant mixture has a pressure from 14 to 16 bar after it is compressed.

* * * * *